United States Patent [19]

Weidanz et al.

[11] 4,029,540

[45] June 14, 1977

[54] APPARATUS FOR FRAMING A PLURALITY OF X-RAY PHOTOGRAPHS OF A GIVEN SIZE

[76] Inventors: Herbert Weidanz, Kursiefener Strasse 16a, 5074 Odenthal-Globusch; Gerhard Sandt, Heimfriedweg 33, 5 Cologne-Hohenhaus; Werner Samoray, Im Leuchterbruch 32, 5 Cologne 80, all of Germany

[22] Filed: Oct. 22, 1976

[21] Appl. No.: 735,077

[30] Foreign Application Priority Data

Oct. 25, 1975 Germany .......................... 2547924

[52] U.S. Cl. ................................ 156/522; 156/562

[51] Int. Cl.[2] .......................................... B32B 31/00

[58] Field of Search .......... 156/559, 560, 561, 562, 156/521, 522

[56] References Cited

UNITED STATES PATENTS

| | | | |
|---|---|---|---|
| 2,718,975 | 9/1955 | Bower | 156/561 |
| 3,197,353 | 7/1965 | Williams et al. | 156/521 |
| 3,992,243 | 11/1976 | Berggren | 156/521 |
| 4,003,779 | 1/1977 | Griswold | 156/562 |

*Primary Examiner*—Douglas J. Drummond

[57] ABSTRACT

The apparatus enables the simple framing or mounting of pre-sorted photographs. The apparatus includes a first transporting device which conveys adhesive-coated cards and a photograph-distributing device above it, which carries a photograph dispensing frame, followed by a deflecting mechanism then a pressure gluing means. A second transporting device conveys covering cards to the pressure gluing means synchronized with the adhesive cards, followed by a transfer mechanism which transfers the bonded-together frames to a delivery station.

30 Claims, 13 Drawing Figures

APPARATUS FOR FRAMING A PLURALITY OF X-RAY PHOTOGRAPHS OF A GIVEN SIZE

Figure 1:
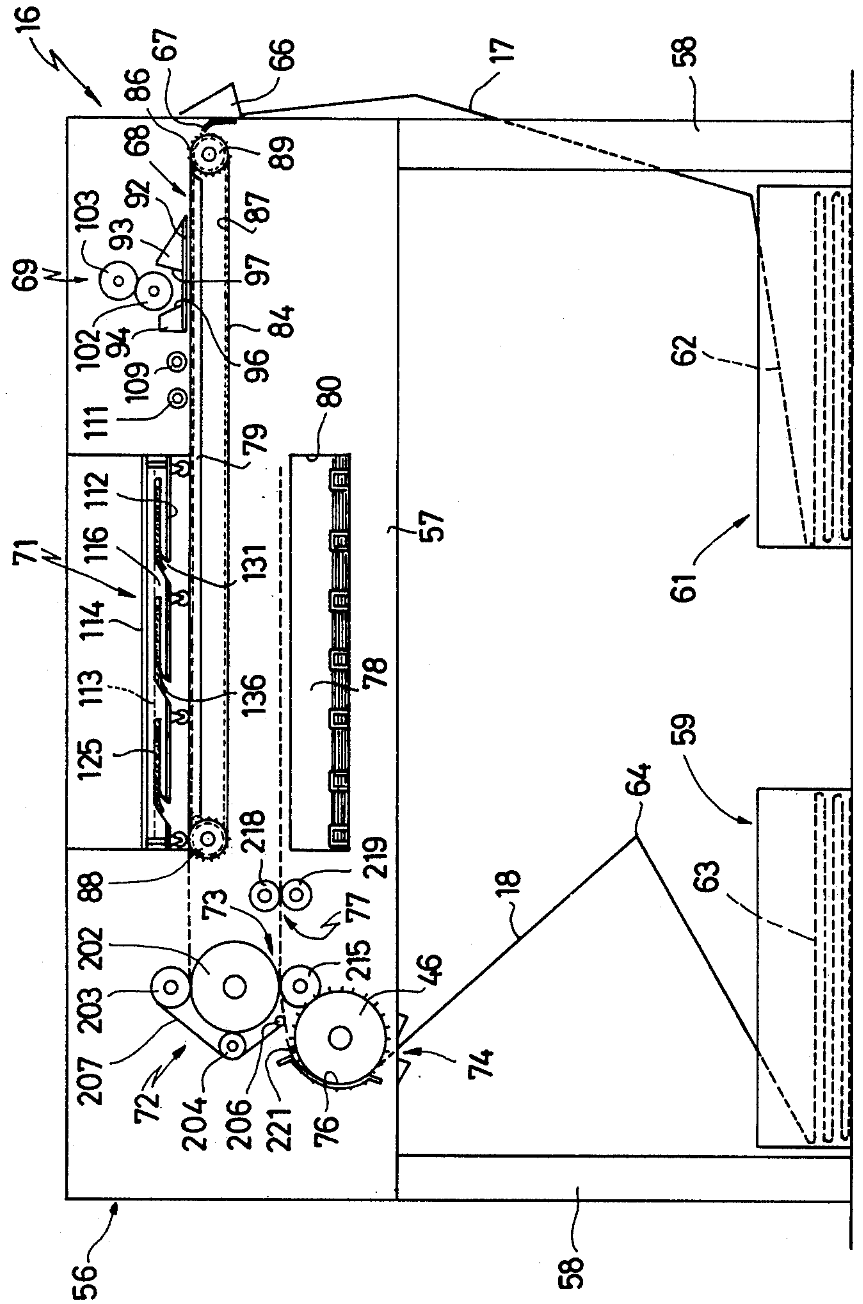

The invention relates to an apparatus for framing a plurality of X-ray photographs of a given size with the aid of a frame which comprises two frame cards and in which the photograhs are arranged between aligned recesses in the frame cards adapted to the picture size, at least one of which cards is in the form of a frame mount having an automatically adhering layer of adhesive, with which the mount adheres to parts of the photographs extending beyond the recess edges and between the recesses or the webs remaining free between the photographs and the edges of the oppositely lying corner mount, both the adhering card and the covering card being provided along their lateral edges with perforations for cooperation with a transport means operating by pin feed drums or the like.

Apparatus of this type is required mainly in large clinics, hospitals, and radiographic and research institutes where a great number of X-ray photographs have to be evaluated daily and, after evaluation, filed away together with a medical record card so that they are available in manageable form, if necessary, for further evaluation or checking. In this connection it has been found advantageous to store the photographs in frames made of relatively strong paper in which series of photographs of a patient are collcted.

The purpose of these framing devices is:

1. To shorten and automate as far as possible the time-consuming framing operation thereby resulting in a saving in staff expenditure,
2. The photographs are to be arranged in the frame in a form which is easy to survey and also advantageous particularly for a comparative observation, thus facilitating subsequent evaluation or checking of the recorded content of the photographs,
3. One aim is to keep the frames as small as possible in the case of a maximum picture size so that a frame containing for example six photographs can be conveniently fitted in a conventional document file.
4. The photographs should obviously be protected as well as possible in the frame.

One apparatus in the field to which the invention relates operates fully automatically in such a way that individual photographs of a series taken of a patient are cut off the film on which they are arranged in series and then glued in frame elements each comprising three photographs mounted side by side or below one another, several of which frame elements are then glued together depending on the number of photographs taken of the patient. Each individual frame element comprises two frame cards which are connected along their lateral limiting edges and folded over one another after the photographs have been applied to the adhesive-coated side of one frame card. In this case the photographs are mounted so that the rows of three extend transversely to the edge perforations of the frame cards, i.e. transversely to the direction in which the frame card is transported. The length of the finished frame elements, measured in the transport direction, is therefore only about ⅓ of their width measured transversely to the transport direction. These relatively short framing elements are then glued together in each case by a self-adhesive marginal strip extending over the edge of one frame card in such a manner that the adjacent longitudinal edges of successive framing elements are joined together as flushly as possible. The joining of further framing elements to form a frame containing photographs of one patient is completed when an identification mark on the film indicates that photographs taken of another patient are about to follow. An, if necessary, not fully occupied row of three in framing element is then filled with blank photographs.

This mode of operation of the known apparatus and the resulting structure of the frames indicate however that the initially mentioned purposes are not fully achieved with the known apparatus.

The known apparatus operates with the still uncut film provided with cutting marks which are scanned by the apparatus for correct repeated cutting of the photographs. To ensure that only the photographs important for subsequent evaluation are framed, the film is first subjected to prelimary evaluation in a separate viewing device. This viewing is provided with a control unit with which the cutting marks can be removed, but the film is still joined together. Those photographs having no cutting mark are not framed with the known apparatus, while the selected photographs are mounted in the frame with their coated sides having the same orientation.

Apart from the fact that a special device is required for presorting, this mode of operation has the added disadvantage that photographs which have been taken of a patient in the opposite photographing direction, must then be viewed in the frame in these different projection directions.

It is impossible to frame for example photographs of the stomach, where the patient is sometimes in the face down position and sometimes in the dorsal position relative to the cathode-ray camera, which is often necessary in showing certain parts of the stomach to prevent outlines cast by other organs, so that the photographs can be viewed "from the front", as it were, in the same direction of projection, as happens in practice with individual photographs and is particularly advantageous for a comparative observation of these photographs.

A further disadvantages of this mode of operation of the known apparatus is that photographs which should advantageously be arranged directly side by side for evaluation, for example pictures of the same organ in different stages of movement, are often spaced from one another at separate places on the frame, which also makes comparative observation of these pictures difficult with a conventional X-ray viewer.

Another disadvantage of the known apparatus is that two work cycles have to be performed in order to produce a frame necessary for more than three photographs, the sticking together of the framing elements necessitating additional control facilitates which complicate the structure of the known apparatus.

Another disadvantage of the frames made with the known apparatus is that they are joined, at the point of connection between two adjacent framing elements, only by the narrow edge strip on one side, a narrow gap being left on the oppositely lying side of the frame between the covering cards adjoining one another at this point. As a result there is formed between individual framing elements a weak point along which they can be easily bent or broken, whereupon the gap beteen the top covering cards is then widened and the framing elements can become detached. There is at least the danger that this gap may widen after repeated bending of the framing elements until parts of the file, in which the frame is kept, may become attached to the free layer of a adhesive on the edge strip, the detachment of the frame then in turn involving unnecessary stress thereon.

It is also particularly disadvantageous that the lateral spacing between two successive rows of three photographs must be relatively wide on account of the edge strip being required for bending adjacent framing elements and is equal to at least twice the width of the edge of an individual framing element which in turn must be larger than the edge strip extending over the lateral edge of the recesses, otherwise the frame cards could not be bonded together along this edge, the overall result being that the size of six photographs, framed in a frame of approximately DIN A -4 size, cannot be substantially greater than 7 × 7 cm, a size which in many cases is still too small for detailed X-ray photographs.

The problem for the invention is therefore to provide an apparatus of the initially mentioned type which fulfills the above purposes better, particularly an apparatus which unables the simple framing or mounting of pre-sorted photographs thus ensuring optimum information content.

This problem is solved in accordance with the invention by the following features:

a. A first transporting device for the adhesive-coated card is provided with a flat and preferably horizontal transporting section above which is arranged a photograph distributing or dispensing device by means of which the photographs are supplied in the proposed order or arrangement and can be applied in this order to the adhesive-coated cards.

b. The photograph dispensing device comprises a frame which consists of two relatively thick plates provided with recesses of the same shape and size as those in the frame cards and can be removably inserted into the apparatus (in accordance with the patent application entitled "Apparatus for simultaneously viewing and/or filing away a plurality of transparent pictures" of 16.9.1975), the photographs being arranged in the said frame at a distance from the transporting plane substantially less than the length of the photographs measured in the transporting direction, in which frame the photographs are slidably mounted in letter box-like compartments for guiding in the transport direction, the lower plate of the frame comprising for each compartment an exit slit pointing in the direction of transport and inclined towards the transport plane, through which slit the photograph can be removed by hand or can be applied to the adhesive-carrying card via a guide face by means of a pusher or slide which engages on the rear edge of the photographs directed away from the slit and drops down into an opening which releases this edge and leads into the recess adapted to the size of the picture.

c. The horizontal transporting section is followed by a deflecting mechanism which deflects the adhesive card, provided with photographs and moving in the transport direction, in the direction of a pressure glueing means where the covering card is bended to the adhesive card.

d. There is provided a second transporting device which conveys the covering card to the pressure glueing means and can be synchronized with the adhesive card transporting device in such a manner that the covering and adhesive-carrying cards meet at the pressure glueing means with their recesses arranged so as not to overlap.

e. The pressure glueing means is followed by a transfer mechanism which grips the bonded-together frame section and transfers the frame to a delivery station.

The apparatus according to the invention is provided with all the equipment necessary for fully automatic mounting of the photographs contained in the dispensing frame.

It can be used to particular advantage in such a way that the photograph dispensing frame, which is suitable for viewing photographs, is used for the first evaluation of the photographs, the photographs arrangement which is most favourable for any subsequent observation being obtained, automatically as it were, with individual photographs having their adhesive-coated sides extending in the opposite direction if necessary and then, while in this arrangement, being also automatically introduced into the paper frame for filing.

The necessity for a frame, containing for example six photographs, to be composed of two frames each carrying three photographs results, in the case of the known apparatus, from the fact that this sequence is maintained in both rows of three. In contrast, the photograph dispensing frame of the apparatus according to the invention enables simultaneous or parallel application of all pre-sorted photographs in the dispensing frame to the adhesive card so that it is possible to use one-piece adhesive and covering cards each having six recesses. This one-piece design of the frame cards then has the advantage that glued joins between framing elements are omitted so that the lateral spacing between separate rows of photographs can be smaller since only a relatively narrow adhesive strip is required between these rows for glueing on the covering card, not a strip having twice the width as is the case with the known apparatus. The frames produced with the apparatus according to the invention can be designed to accommodate a larger size of photograph where the width is predetermined. In this connection it should be particularly stressed that the file size based on the conventional DIN size is characterised by a width/height ratio of approximately 2:3 and conventional cameras produce a square size of photograph. If therefore the usable width of a frame is limited, its potential height cannot usually be exploited either. Also a relatively slight widening of the usable square photograph size by only 1 or 2 cm is therefore of considerable practical importance since the information content of a photograph proportional to the area increases quadratically with the increase in its linear dimensions.

Other advantages of the apparatus according to the invention and the frames produced thereby are that no equipment, which would complicate the structure of the apparatus, is required for folding down the frame cards and that the frames are stronger since they do not have any weak areas between individual rows of photographs which favour bending.

Since the photographs must be suitable for insertion individually into the dispensing frame, it is advantageous if they are taken not on a strip of film which is larger than the photograph size and would have to be cut later, but from the beginning on sheets of film having the proposed size. However, even when photographs have been taken with a camera using a plurality of long strips of photographic film which must be cut into individual photographs either by machine or by hand in order that the photographs may be inserted individually and separately into the dispensing frame, the overall time required therefor is overcompensated by the fact that any subsequent observation or evaluation of the mounted photographs requires substantially less time on account of the advantageous arrangement of the photographs. In this connection it should also be taken into account that during each evaluation a doctor will view the photographs several times.

The photograph dispensing means of the apparatus according to the invention operates in such a way that the photographs are pushed out of the slit in the compartments by means of the sliders or pushers, while the transporting device in the horizontal transporting section conveys the adhesive card under and past the photograph dispensing means. The photographs are gripped when their front edges, emerging obliquely first through the exit slit, come into contact with the adhesive-coated card, the distance between the slits and the conveying plane being approximately such that for example ⅓ to half of the length of each photograph is pushed out when the photographs come into contact with the adhesive card. It is necessary for this spacing to be precisely maintained in order that photographs arranged side by side in the dispensing frame may also be mounted side by side on the adhesive card, and not in a staggered relationship to one another in the transporting direction. The adhesive card must also be precisely guided in the transporting device and should not be accelerated hereby when the photographs are applied, which might occur owing to a certain degree of stiffness in the photographs when the latter are moved out of their compartments at a slightly higher feed rate than the rate of conveyance of the horizontal transporting device. There would then be the danger of the adhesive-coated card and covering card not meeting simultaneously at the pressure glueing station.

A constant rate of conveyance for the adhesive card and very precise smooth guiding thereof are achieved in accordance with an embodiment of the invention in that the device for transporting the adhesive cards in the horizontal transport section comprises two pin feed belts, which rotate on both longitudinal sides of a horizontal plate supporting at least the area of the adhesive cards where the photographs are applied and engage with pins in the edge perforations on the adhesive cards, the upper sides of the said pin feed belts extending through the plane of the horizontal plate, and in that the inner sides of the pin feed belts are in the form of toothed belts which mesh with one or a plurality of gears or toothed wheels driven by a central driving motor.

The precise observation of the critical spacing between the photograph dispensing frame and transporting device as well as the coincident superposed arrangement of the photographs, with the recesses in the adhesive card adapted to the photograph size, are also improved in accordance with an embodiment of the invention if the photograph dispensing frame is located on a base plate of the dispensing means which is provided with apertures for opening the exit slits of the lower frame plate and on its lower side the guide of the exit slit supports guide elements extending in the direction of the horizontal plane of the transporting device, which guide elements are brought into practice in another embodiment in that sliding rollers or drums made of silicone rubber, which are spaced apart by a distance approximately equal to the width of the photographs, are provided on the underside of the base plate approximately at the height of the end section of the guide elements which impart an angle of inclination to the guide, and press the photographs on to the adhesive coating of the cards, and in that the guide elements are designed as sliding plates which are arranged between the sliding rollers, beginning at a short distance from the edge, facing the rollers, of the exit opening in the base plate and extending from the latter with a somewhat steeper angle of inclination than the guide slits in the frame, the sliding face of the said sliding plates extending until it lies below the axle of the feed rollers. The base plate is then in turn supported by the sliding rollers on the transporting device or the adhesive coating of the card to which the rollers, however, do not still adhere since they are made of silicone material. When the photographs are pushed out of the compartments in the dispensing frame, the front edges of the photographs first come into contact with the inclined guide face of the sliding plates, the short distance between the upper ends of the sliding plates and the exit slit ensuring that the photographs cannot fit flatly on the sliding plates thus making it also impossible for them to be scratched. At the point where the sliding plate enters the gap between the sliding rollers, engaging below their rotating axle, the front edges of the photographs are in contact with the circumferences of the sliding rollers and guided further thereby for the short remaining distance until they are brought into contact with and pressed against the adhesive-coated card, whereupon each of the photographs is further conveyed at the rate determined by the transporting device. From this moment it is no longer necessary for the grippers to be moved in a forward direction so that their degree of movement may be even less than the length of the photograph.

The photograph dispensing frame is preferably made of two plastic plates which are glued together. It may not always be possible then to prevent this frame from having a certain curvature, which might lead to great variations in the spacing between individual exit slits in the pocket-like compartments and the plane of conveyance.

It is therefore advantageous if the photograph dispensing means comprises a covering plate, which is spaced from the base plate by a distance equal to the thickness of the frame and, together with the base plate, defines an insert pocket for the photograph dispensing frame, the said covering plate being provided with slit-shaped apertures extending approximately over the length of the photographs, through which downwardly projecting parts of the pushers, in their position of contact with the rear edges of the photographs, can drop into the recesses in the dispensing frame to free the edges of the photographs. Even in a flexible type of photograph dispensing frame, it is therefore always ensured that the frame is maintained at the exact proposed distance from the conveying plane.

The insertion of the dispensing frame into the position for pushing out the photographs is further improved in another embodiment of the invention in that the insert pocket is defined in its longitudinal direction by guide elements engaging on the front and rear transverse edges of the dispensing frame.

Another measure which simplifies control and handling of the apparatus according to the invention and is particularly convenient in its embodiment consists of providing a control or sensing device which limits the insert movement of the dispensing frame and grips the end thereof, which device sets the apparatus into operation and maintains the frame in its inserted position at least until the removal of the photographs is completed, releasing the frame again at the end of this work cycle and pushing it at least a short distance out of the insert pocket when the pushers are returned to their starting position. The user can then comfortably grip the photograph dispensing frame on the exposed section and remove the frame completely. Such a control device is simply obtained in accordance with an embodiment of the invention by providing two levers, provided on a shaft rotatably mounted above the covering plate in the longitudinal direction of the frame, for example along the inner edge of the inserted frame, and projecting downwardly through transverse slits in the covering plate, which levers come into contact with the inner longitudinal edge of the frame upon insertion thereof and are pivoted in opposition to the force of tension springs, the frame being locked simultaneously and the work cycle of the apparatus initiated, which levers eject the frame from the insert pocket again when pivoting back under the influence of the tension springs, if the locking of the frame is terminated again after the work cycle is completed.

In order that the photographs may be applied to the moving adhesivecoated card in exactly the same arrangement as in the photograph dispensing frame, it is ncesssary for the pushers to be operated simultaneously. Pushers suitably designed and controlled for this purpose are obtained in accordance with an embodiment of the invention in that they are in the form of one-armed levers, pivotably mounted on axial rods, which extend transversely to the feed direction and are rigidly arranged in a slide capable of travelling back and forth by the degree of movement, and resiliently supported on the upper side of the covering plate, a downwardly projecting sliding tooth being arranged on the free end of each lever, the pushers being supported in their starting position on an horizontal end section, keeping the sliding tooth at a vertical distance from the recess in the frame, of a guide lug sloping in the direction of feed and projecting upwardly from the covering plate. In this connection, in another embodiment of the invention a shaft, crossing the slide at right angles to the feed direction and mounted on the covering plate, is provided for driving the slide by the distance necessary for pushing out the photographs and comprises two gears rigidly connected to the shaft and meshing with toothed racks mounted on and rigidly connected to both lateral edges of the slide, and the end of the said shaft extending over the edge of the covering plate being provided with another gear which is non-rotatably mounted thereon and meshes with a toothed rack, driven with a reciprocating motion in the direction of feed and mounted on the housing of the apparatus below the photograph dispensing means.

This design and arrangement of the dispensing means and driving elements for the pushers makes it possible for the dispensing means to be in the form of a unit capable of pivoting upwardly away from the transporting device, if the pivot for this unit is arranged so that during pivoting the driving gear at the end of the shaft driving the slide is lifted away from the reciprocating toothed rack. However, this can be simply done because the pivot is arranged on the side of the apparatus lying opposite the rack or extends outside the rack when seen from the transporting device, which may be easily achieved by means of pivoting linkages with a sufficiently wide overhang. The photograph dispensing means designed to swing down has the added advantage that the transporting device is easily accessible should a fault occur thereon or on the adhesive card transported directly thereon, for example as a result of the photographs being incorrectly pushed out.

As already mentioned, the correct mounting of the photographs on the adhesive-coated card is dependent on the rate at which firstly the transporting device and secondly the pushers are driven. It should first be assumed that the photographs can in principle be applied to the adhesive card with the photograph size being in the correct position coincident with the recesses in the said card, even when the feed rate of the pushers differs from that of the horizontal transporting device in which case these variations in speed can only be allowed for by an appropriate forward movement of the transporting device or pushers. In either case, from the moment when the photographs adhere to the coating on the adhesive card with their front edges or front edge sections, they are further conveyed at the rate of conveyance of the adhesive card and pressed thereon under the sliding rollers. If the feed rate of the pushers is only negligibly greater than that of the transporting device, the photographs are subjected to a relatively strong S-shaped sagging or bending action between the join under the feed roller and the exit slit. However, this does not prevent the proper adherence of the photographs to the adhesive card.

If, however, the feed rate of the pushers is substantially higher than the rate of conveyance of the adhesive card in the horizontal transport section, the initially weak S-shaped curvature of the photograph between the point of application in the conveyance plane and the exit slit of the dispensing frame very rapidly becomes stronger so that the join moves very rapidly back from the point of application in the opposite direction to the conveying direction, which may lead to uncertain bonding to the adhesive card. When the distance between the plane of the photograph dispensing frame and the plane of conveyance is relatively small, there is then also the danger that the photograph may be bent into an undulatory shape so that "creases" may be formed when it is fed through the rollers.

If, on the other hand, the feed rate of the pushers is substantially lower than the rate of conveyance of the adhesive card, it is possible that the edge of the photograph may be reliably gripped and moved with the adhesive layer of the more rapidly moving adhesive card not from the moment when it first comes into contact with the adhesive card, but only when the photograph has been moved a little further on, which can result in the photograph being gripped too late and moved rearwardly in relation to its desired position on the adhesive card.

It is therefore advatageous if the feed motions of the pushers and transporting device are synchronized so that the pushers are moved at approximately the same rate as the transporting device for the card.

Such synchronization is achieved by simple technical means in accordance with an embodiment of the invention in that the reciprocating motion of the toothed rack driving the shaft is derived, with the aid of a driving linkage, from the rotary motion of a disc cam which is driven by a central driving motor and controls the deflection of a one-armed pivoting lever in opposition to the tension of a return spring, which lever is pivotally connected by means of a push rod to a second one-armed lever some distance from the pivot thereof, the free end of said second lever engaging, with a pin extending perpendicular to the pivot plane, in a fork rigidly connected to the rack.

Precise synchronization of the pushers and transporting device may be achieved in principle with this very simple driving mechanism by appropriate shaping of the control cam but, because a certain and relatively small variation in speed can be absorbed as a result of the flexibility of the photograph, this is not important as long as it is simply ensured that the feed rates of the pushers and transporting device do not differ too much, which can be easily achieved with the said simple design measures.

The advantages of the invention is achieved by the features of claims 14 to 30 are listed below:

With the aid of a deflecting mechanism according to the feature of claim 14, it is possible to utilize the space below the horizontal transport section for mounting the removing device connected to the pressure glueing means and use the station for delivering the finished framing cards, which contributes to the compact structure of the apparatus according to the invention.

An apparatus having the features of claim 15 permits particularly careful deflection of the adhesive card and introduction thereof into the pressure glueing means, the feature of claim 16 achieving reliable insertion of the card into the pressure glueing means by way of an additional guide which can be an embodiment comprising only a few components in accordance with the feature of claim 17.

As a result of the feature of claim 18 constant movement of the adhesive card by frictional contact is ensured by the deflecting mechanism which prevents creasing and resulting bending of the adhesive card between the horizontal transport section and the deflecting mechanism and ensures positive movement of the adhesive card into the pressure glueing means.

With an apparatus according to the features of claim 19 it is possible for the covering cards to be conveyed upwardly out of a store arranged below the apparatus and conveyed at a definite speed to the pressure glueing means by the pin feed drums for altering the direction of conveyance, which enables the apparatus to have a very compact design. Moreover, the dimensioning and arrangement of the pin feed drums ensures that the covering cards may be lifted safely out of the pins so that they are not damaged during removal of the finished frames.

It may also be advantageous to select the diameter of the pin feed drums so that they rotate through exactly 360° during each work cycle. It is then possible, in a particularly simple manner, for the feed of the pin feed drums to be controlled by means of a disc cam which is driven by the central driving motor of the apparatus and also completes a full revolution during each work cycle.

With an apparatus having the features of claim 21 the coincident meeting of the adhesive and covering cards at the pressure glueing station is ensured by the covering cards being lefted from the conveying pin feed drums along a path precisely defined by guide elements. In this connection the free end sections of the covering cards, which first enter the pressure glueing means, may also be stabilized and stiffened by the feature of claim 22.

Through the features of claim 23 a precise synchronization of the devices for transporting the covering and adhesive cards is achieved by simple technical means, the drive of which transporting devices can be derived from a single central driving motor for the entire apparatus on account of the positive connection, which is instrumental in simplifying the structure of the apparatus according to the invention.

The feature of claim 24 makes it possible to divide up the glueing operation which is performed in the central strip of the frame by the deflector roller/feed roller combination and taken over by the two opposite feed rollers of the removal device at the two lateral edge strips supporting the perforations for transport. This enables particularly space-saving mounting of the pressure roller between the pin feed drums of the covering card transporting device.

The apparatus according to the invention can be designed so that the adhesive-coated cards and/or covering cards are fed individually thereto. In the case of fully automatic apparatus arrangements are then required to grip the cards individually and move them into definite starting positions thus ensuring simultaneous and coincident meeting of the covering and adhesive cards. In contrast, an apparatus operating with adhesive and cover cards having the features of claim 25 has the advantage that the definite starting position of the frame cards is always ensured if the first pair of adhesive and covering cards has been moved into its correct starting position. This can be achieved for example if the central driving motor can be disconnected from the transporting devices so that they can be manually rotated by means of handwheels mounted on free ends of the driving rollers and the frame cards thus inroduced into the apparatus for a single adjustment of their starting position. The additional equipment required for this initial adjustment can be constructed by extremely simple technical means so that the apparatus is a space-saving arrangement on account of the fact that additional automatic facilities for feeding the frame cards in the proper direction may be omitted, which is also instrumental in simplifying the structure of the apparatus according to the invention if further embodied by the features of claim 26.

If the adhesive cards are spaced at intervals on a protective strip so that, after their removal, they and the other adhesive cards on the concertina-type strip no longer cohere, but the covering cards are designed as a coherent concertina-type strip, the said cards being separated from one another by a perforation mask, then it is sufficient to separate the covering cards if, in accordance with the feature of claim 27, the device for drawing the finished frame out of the pressure glueing means is driven at a greater speed than the transporting device of the covering card or adhesive card. A variation in speed sufficient for this purpose is indicated by the feature of claim 28.

There is then another advantageous embodiment of the invention according to the features of claim 29 which ensures that the following adhesive card in each case is always located in its correct starting position for the next work cycle.

It is particularly advantageous to equip the apparatus with an activated blade in accordance with the features of claim 30 which ensures that the adhering frame cards are reliably severed with a smooth cutting edge;

this blade can also prevent the tearing of the edges of frame cards to be separated, which cannot always be avoided with only a perforation mark subjected to stress.

Figures 2, 3, 4:
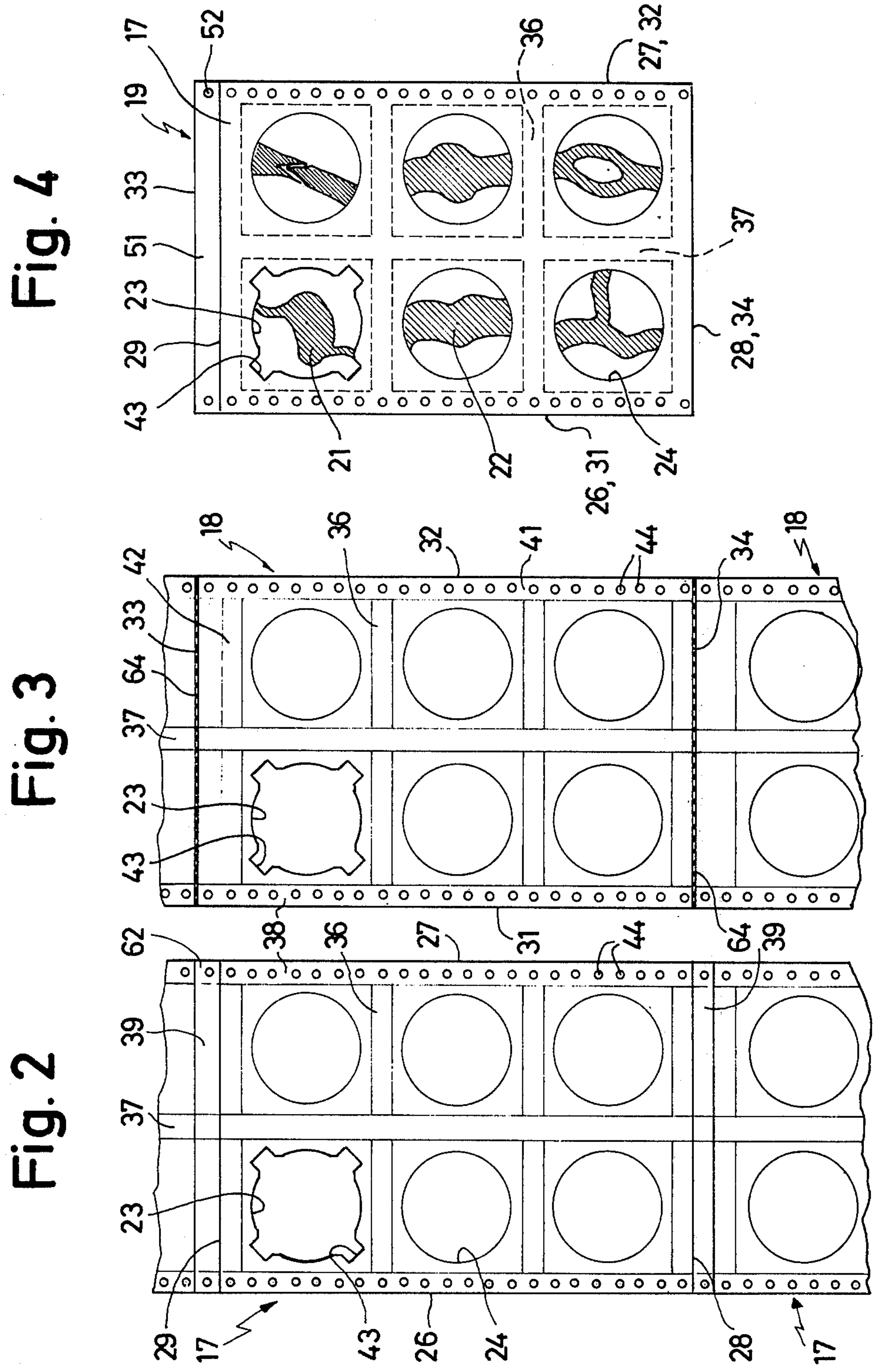
Figure 5:
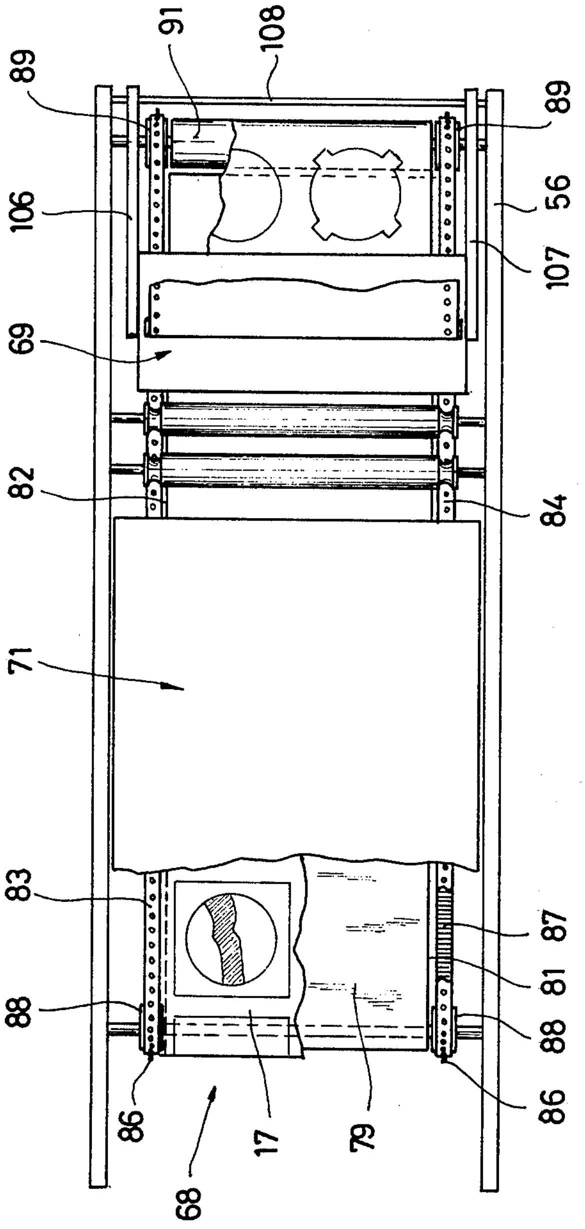
Figure 6:
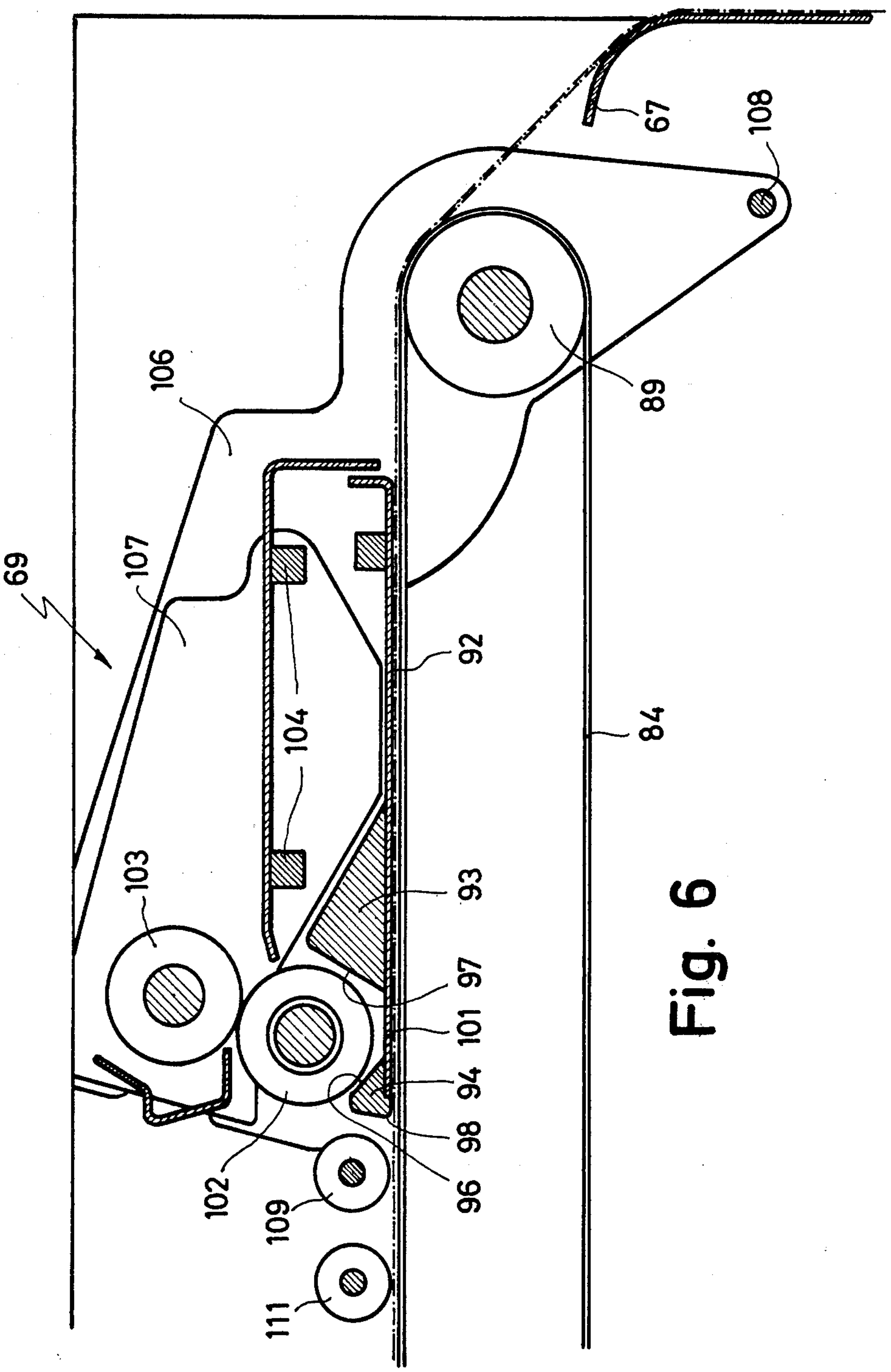
Figure 7:
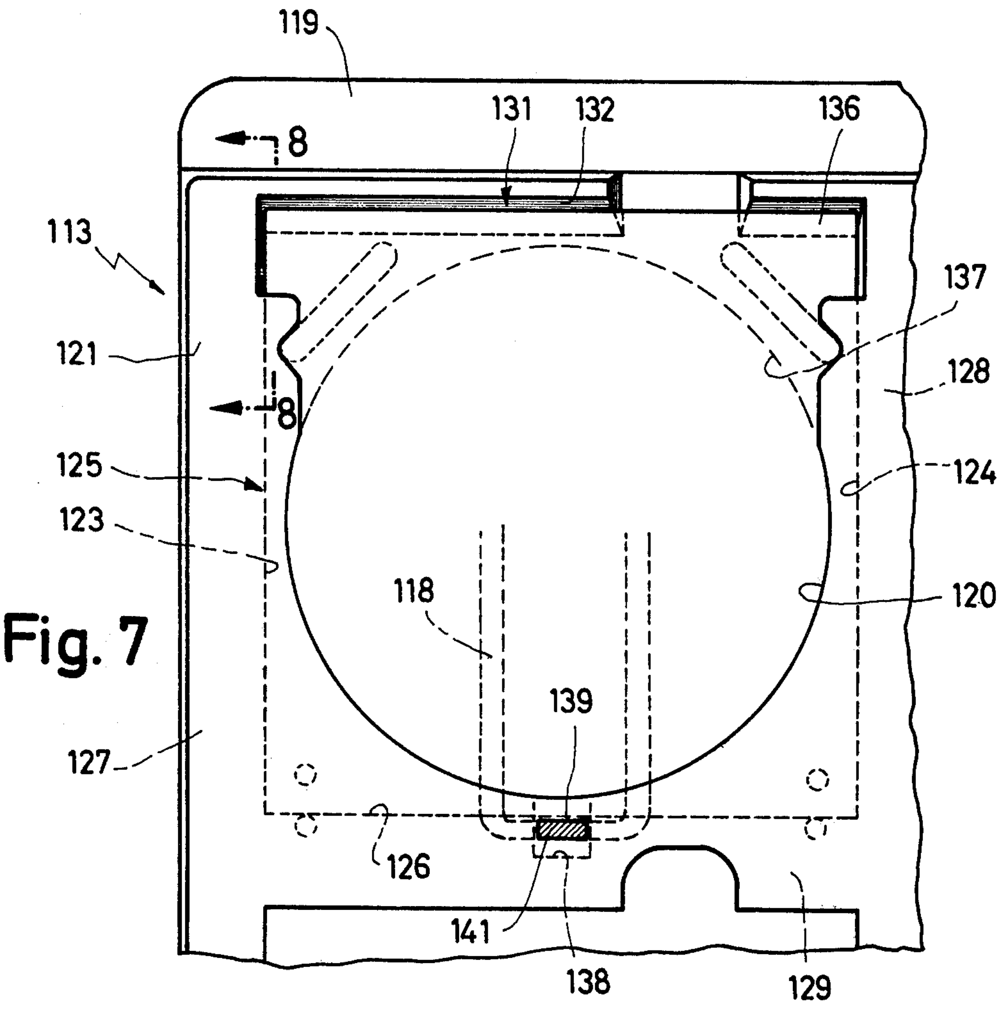
Figure 8:
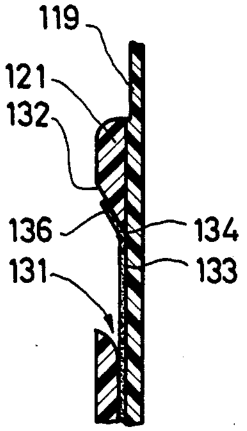

Other advantages and features of the invention are disclosed in the following description of a preferred embodiment with the aid of the drawings:

FIG. 1 is a simplified view of an apparatus according to the invention in side elevation, FIG. 2 shows adhesive-coated cards mounted on a transportable strip, and FIG. 3 shows covering cards for making a frame for circular photographs, FIG. 4 shows a frame with differently mounted photographs, made with the frame cards according to FIGS. 2 and 3, FIG. 5 shows the adhesive card transporting device of the apparatus according to FIG. 1;

FIG. 6 shows the device according to FIG. 1 for removing the protective strip from the adhesive-coated cards according to FIG. 2, FIG. 7 is a fragmentary underneath view of a photograph dispensing frame for the apparatus shown in FIG. 1, FIG. 8 is a section along the line 8 — 8 shown in FIG. 7.

Figure 9:
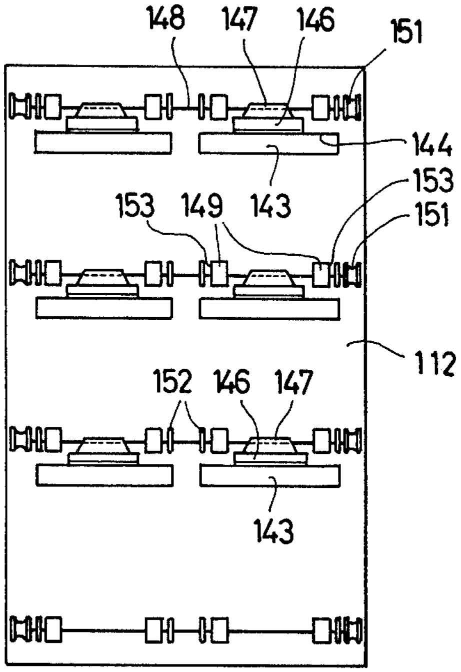
Figure 10:
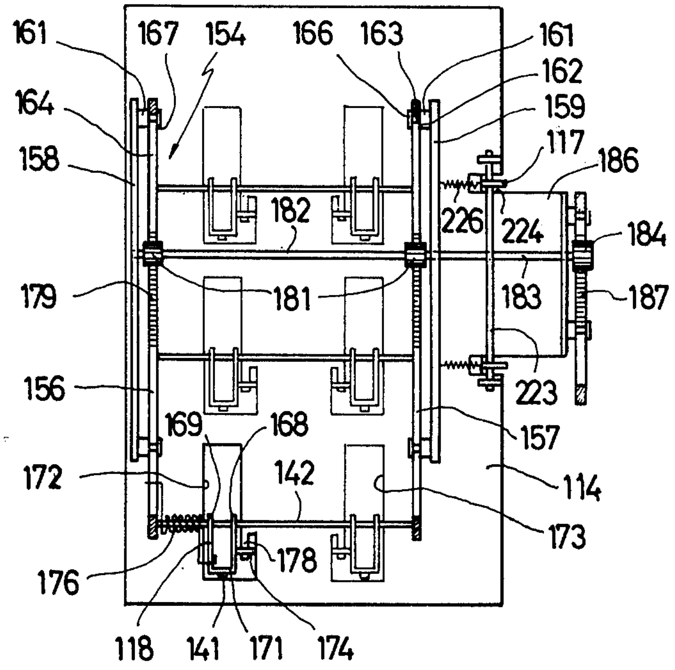
Figure 11:
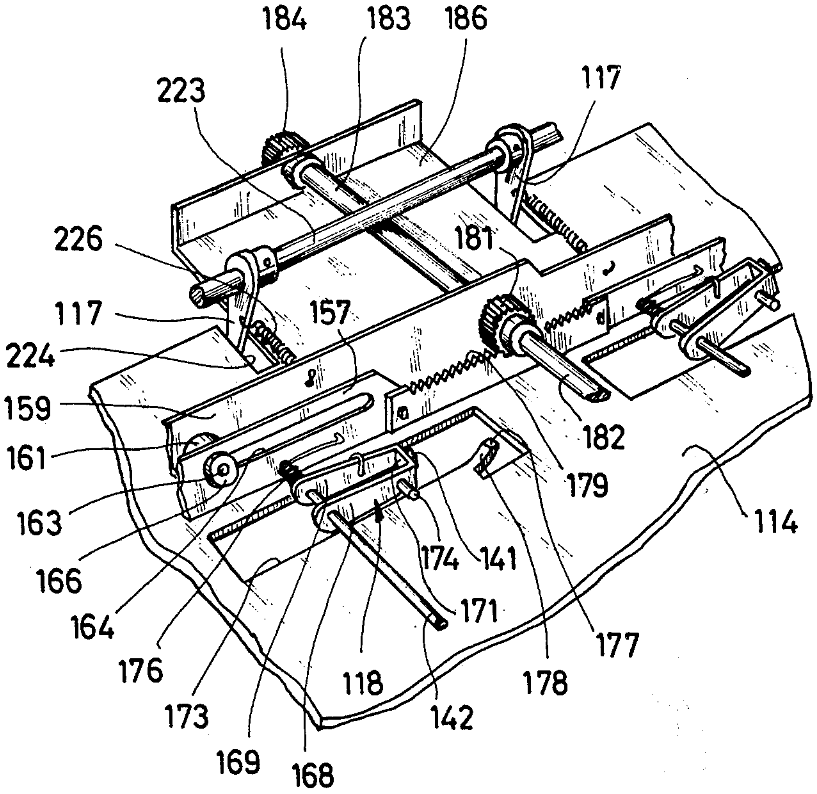
Figure 12:
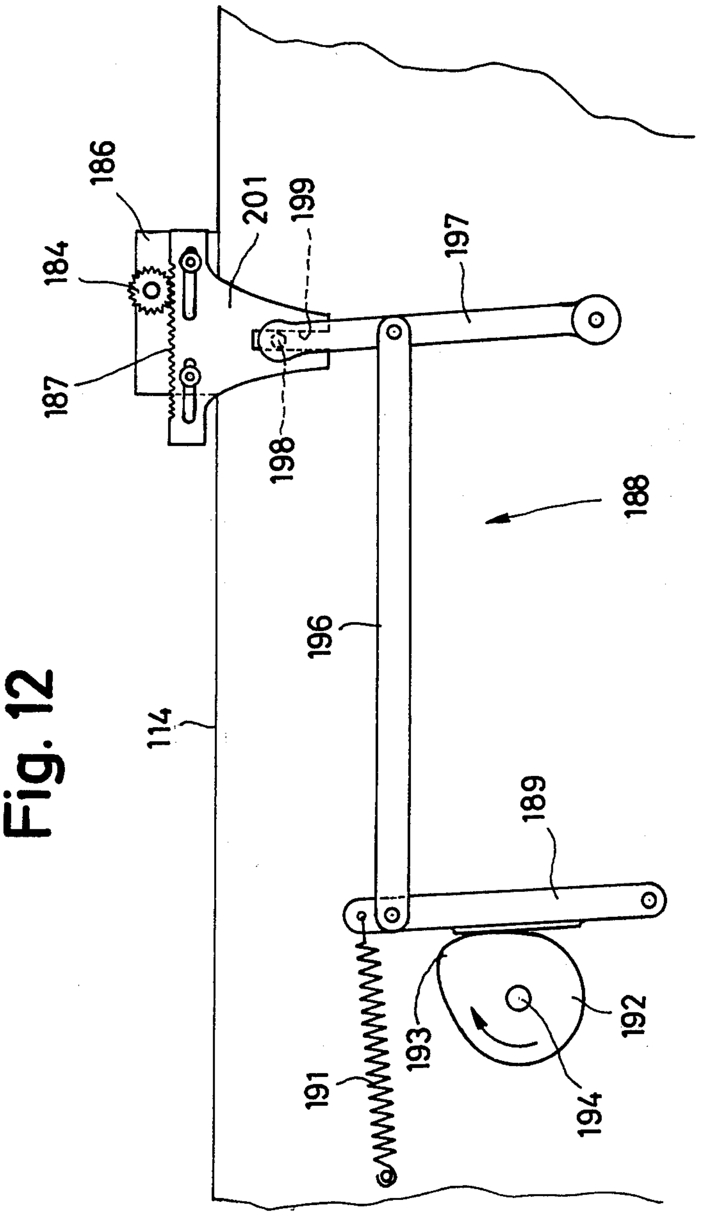
Figure 13:
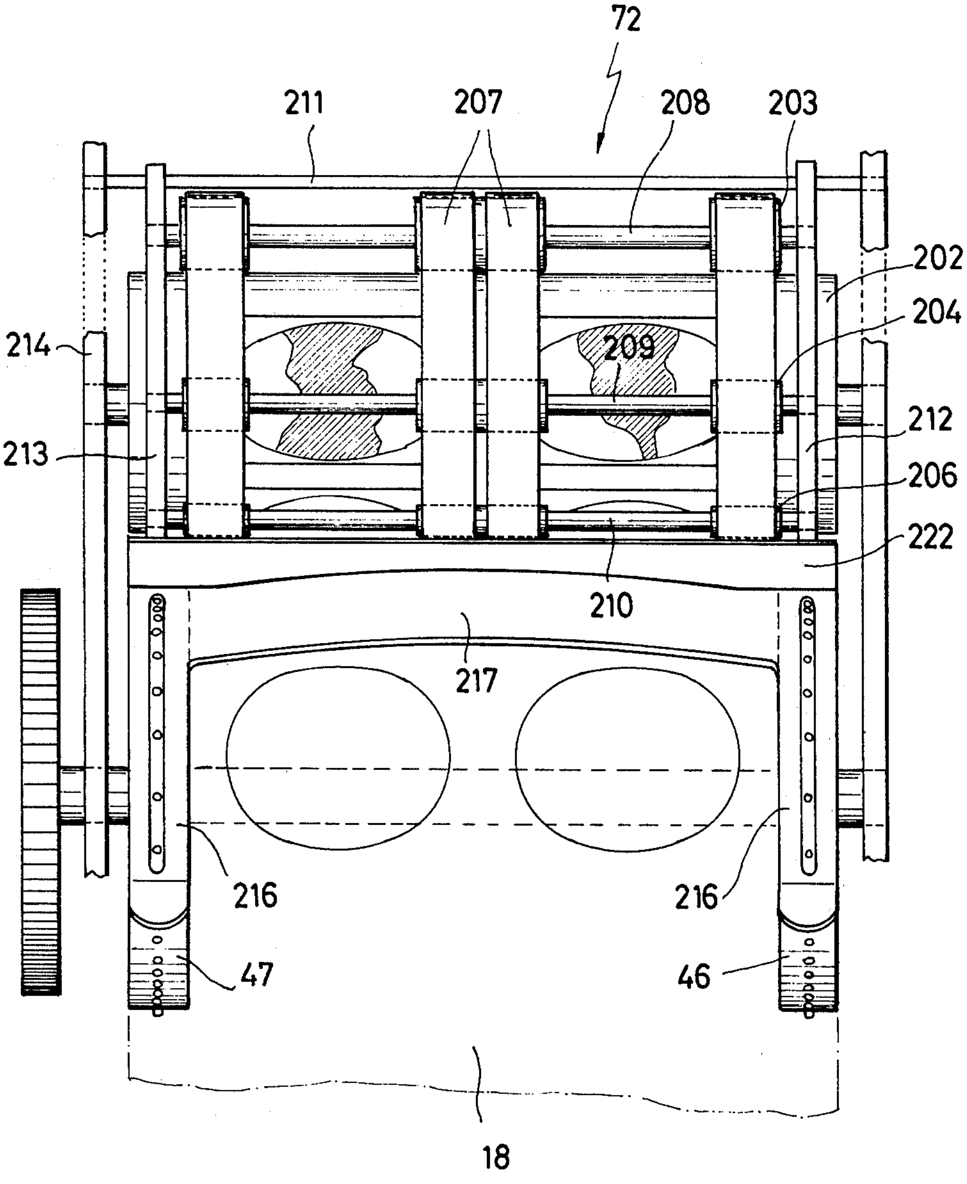

FIG. 9 is an underneath view of the base plate of an insert compartment for the photograph dispensing frame shown in FIG. 7, FIG. 10 shows the cover plate of the insert compartment for the photograph dispensing frame according to FIG. 7 with means for pushing the photographs out of the dispensing frame, FIG. 1 shows details for FIG. 10 in perspective view, FIG. 12 shos a driving linkage for driving the devices according to FIGS. 10 and 11, and FIG. 13 shows details of a mechanism for deflecting the adhesive cards and a device for transporting the covering cards according to FIGS. 1 to 3.

The frames 19, shown in FIG. 4, for mounting six X-ray photographs 21 and 22 of 10 × 10 cm size may be made from frame cards 17 and 18 of the type shown in FIGS. 2 and 3 with the aid of the automatic apparatus illustrated in FIG. 1. The frames are rectangular in form, with a height of approximately 36 cm and width of approximately 24 cm. they are used for the filing and/or simultaneous comparative viewing of the photographs 21 and 22 in the frame 19 which have been taken of a patient. The frame 19 consists of two frame cards 17 and 18 made of a strong, but still sufficiently flexible paper, between which are mounted the the photographs 21 and 22 between parallel recesses in the frame cards 17 and 18 adapted to the photograph size. The photographs 21 and 22, the size of which is indicated by broken lines in FIG. 4, are mounted at intervals from one another in both the longitudinal and transverse directions of the frame 19 and spaced from the longitudinal and lateral edges 26 to 29 and 31 to 34 respectively of the frame cards 17 and 18 so that between the photographs 21 and 22 and along the edges there remain narrow transverse and longitudinal webs 36 and 37 and narrow longitudinal and transverse strips 38 and 39 or 41 and 42 which are not covered by the photographs 21 and 22 and along which the frame cards 17 and 18 can be glued together. The width of these webs or edge strips is aproximately 12 mm. The recesses 23 and 24 of the frame cards 17 and 18 are designed to accomodate a circular photograph size having a diameter of approximately 9 cm. The openings 23 on the frame cards 17 and 18 which in each case release the first photograph 21 of a patient for viewing are provided on their edges with approximately rectangular recesses 43 in the corner sections of the photographs 21, in which recesses are arranged areas of the first photograph 21 containing information about the patient and/or other characteristic data on the information content of the photographs 21 and 22. One of each pair of frame cards is designed as a card 17 with a self-adhesive coating whereby it adheres to the oppositely lying frame or covering card 18 and the photographs 22 and 23 mounted between the frame cards 17 and 18. On the longitudinal strips 38 and 41 not covered by the photographs 21 and 22, the frame cards 17 and 18 are provided with transport perforations in the form of round holes 44 which are arranged at approximtely 6 mm from the longitudinal edges 26 and 27 or 31 and 32 of the adhesive card 17 or covering card 18 and at intervals of approximately 12 mm from one another. The perforations, in which the pins of pin feed drums 46 and 47 and conveying belts 83 and 84 of transporting devices for the adhesive cards 17 and the covering cards 18 can engage, have a diameter of approximately 4 mm. the covering card is longer than the adhesive card 17 by approximately the repeat length of the transport perforations 44 and, in the finished frame 19, is glued to the adhesive card so that alternate perforations 44 are covered by the transverse webs left therebetween, and on the lateral edge 29 of the adhesive card 17 adjacent to the photograph 21 with the markings there remains a narrow edge strip 51 extending over this edge 39 with two non-covered perforations 52 by means of which the frame 19 can be suspended from a holder for viewing the photographs 21 and 22.

The apparatus 16 according to the invention for automatically making frames 19, which is illustrated in greatly simplified form in FIG. 1, comprises a substantially rectangular housing 56, the length of which is approximately three times the length of of a finished frame 19 and the width of which is about one and a half times the width of the frame 19. The height of the housing 56 is approximately equal to the length of a frame card 17 or 18. For the sake of simplicity of illustration the front panel 57, which is facing the viewer and defines a vertical longitudinal face of the housing 56 is represented as transparent. The housing 56 is provided with four standing legs 58 of such a height that upwardly opening holders 59 and 61 for storing the covering cards 18 and adhesive cards 17 can be provided below the housing 56, the said cards being introduced into the apparatus on opposite sides. In this case the adhesive cards 17 are spaced apart, with their adhesive coating on a protective conveying strip 62 also provided with edge perforations 44, by a distance equal to the repeat length of the perforation 44 and laid in the store 61 with a concertina-type fold. In contrast, the covering cards 18 form a cohesive strip 63 which is also introduced with a concertina-like fold into the holder 59 and on which the cards are separated from one another by a perforation mark 64 extending along their transverse edges 33 and 34 and comprising narrow slit perforations running along these edges.

The adhesive card strip 63 is introduced into the apparatus through a guide inlet 66 provided on the right-hand vertical transverse wall of the housing 56 (as seen in the drawing) and leads along a curved guide surface 67 to a transporting device 68 with a horizontal plane of conveyance, along which the strip 62 is first moved into a device 69 which removes the protective strip 62 covering the adhesive coating of the cards 17, and then into a photograph dispensing means 71 in which the photographs 21 and 22 are applied on the adhesive-coated card 17 in the proposed arrangement. The horizontal transporting device 68, which ends with the photograph dispenser 71, is followed by a deflecting mechanism 72 which alters the direction of conveyance of the adhesive cards 17 by 180° and guides the cards, with the photographs 21 and 22 mounted thereon, to a pressure glueing means 73 where the covering cards 18 are glued to the adhesive cards 17 by pressure. The covering cards 18 are introduced into the apparatus through an insert opening 74 on the underside of the housing and conveyed to the pressure glueing station 73 by means of pin feed rollers or drums 46 and 47, mounted above this opening 74 and engaging in the edge perforations 44 of the covering cards 18, and a guide face 76. The pressure glueing means 73 is followed by a frame removing device 77 which draws the finished frame 19 out of the pressure glueing means 73 and conveys it into a delivery compartment 78 below the photograph dispenser 78, which compartment is accessible from the outside through a rectangular aperture 80 in the front panel 57 of the housing 56.

The structure of these working units of the apparatus according to the invention is explained in more detail below with the aid of FIGS. 1 and 5 to 13.

The transporting device 68 comprises a smooth-surfaced metal plate 79 extending in the plane of conveyance the adhesive cards being able to slide well over the said smooth surface. The width of the metal plate 79 is equal to the width of the adhesive cards 17, less twice the width of the perforated edge strips of said cards, so that the cards are supported by the metal plate 79 at least in the areas covered by the photographs 21 and 22. Running along the lateral edges 81 and 82 of the metal plate 79 are driven conveying belts 83 and 84, the outer sides of which carry pins engaging in the perforations 44 in the adhesive cards 17 and their inner sides comprise a toothing 87 which meshes with gears 88 and 89 mounted on either side of the metal plate 79 in the vicinity of its end facing the insert opening 66 or the divering mechanism 72. The gears 89 facing the insert opening 66 are mounted on the two outer ends of a roller 91 which is rotatably mounted on the housing 56 and used at the same time as a roller for diverting the adhesive card strip 62. The gears 88 facing the deflecting mechanism 72 are mounted on an axle running below the end of the metal plate 79 facing the deflecting mechanism 72, which axle is likewise rotatably mounted on the housing 58. To drive the transporting device 68 it is then sufficient for either the gears 88 or the gears 89 non-rotatably connected to the roller 91 to be driven by a driving mechanism (not shown).

As can be best seen from FIG. 6, the strip removing device 69 comprises a flat guide plate 92 running parallel to the metal plate 79 of the transporting device 68 and vertically spaced from the metal plate 79, which enables easy sliding of the transport strip 62 lying with the adhesive card 17 on the metal plate 79. In order that the pins 86 of the conveying belts 83 and 84 may pass through the perforations 44 in the cards 17 and transport strip 62, the plate 92 is provided with grooves (not shown) running along its edge. In the front part of the plate 92 two prism-shaped bars, extending at right angles to the conveying direction, are attached to the upper side of plate 92 some distance from one another. The two bars 93 and 94 have, respectively, wedge-shaped and trapezoidal cross sections, their flanks 96 and 97 facing one another extending downwardly towards one another to form an approximately V-shape and defining a recess 101 which extends transversely to the transport direction and above which are mounted two pressure rollers 102 and 103 which rotate in opposite directions and move the transport strip 62 away through frictional contact, the axes of rotation of the said rollers running parallel to the sit 101 in the guide plate 92, the lower pressure roller 102 projecting slightly into the free position laterally defined by the sides 96 and 97 in order to minimize the overall height of the strip removing apparatus 69. The strip 62 is drawn upwardly at approximate right angles from the adhesive card 17 via the left-hand rounded bottom edge, facing the photograph dispenser 71, of the prism-shaped bar 94 arranged on the exit side. The guide plate 92, the prism-shaped bars 93 and 94 and the axles of the counter-pressure rollers 102 and 103 are arranged between perpendicular plates 106 and 107, which are connected by transverse bars 104 and the planes of which lie in both sides outside the transporting device 68, and which can be pivoted upward about an axle 108 extending transversely to the conveying direction. The strip removal device can then be conveniently folded upward, for example for the first introduction of the strip 62 into the slot 101. In order to maintain the adhesive cards 17 between the strip removing device 69 and photograph dispenser 71 in contact with the metal plate 79 or the transport perforations 44 of the cards in engagement with the pins on the conveying belts 83 and 84, two feed rollers 109 and 111 are provided, running transversely to the transporting device 68. The feed rollers 109 and 111 are made of silicone rubber material so that the adhesive coating on the cards 17 will not remain adhering to the rollers and be lifted thereby from the transporting device 68. It is in itself sufficient if rollers extending over the entire width of the transporting device are simply replaced by pressure rollers which maintain the edge strip and perforations 44 in contact with the pin feed belts 83 and 84. Like the rollers 109 and 111, these rollers comprise a groov e in wich the pins of the conveying belts can engage throughthe perforations 44 in the adhesive cards 17.

The photograph dispensing means 71 which is followed by the strip removing device 69 when seen in the conveying direction is arranged in the centre of the housing 56 above the transporting device 68. It comprises a base plate 112 extending some distance from and parallel to the metal plate 79 and a cover plate 114 arranged some distance from the thickness of a photograph dispensing frame 113 parallel thereto, which plates define an insert compartment or pocket 116 into which the photograph dispensing frame 113 can be inserted from the front panel side until a final position defined by spring-loaded stop levers 117 is reached, in which position the photographs 21 and 22 can be moved with the aid of pushers 118 out of the dispensing frame 113 and on to the adhesive cards 17.

The structure of the photograph dispensing frame 113 can be best seen from FIG. 7 in combination with FIG. 1. The dispensing frame 113 consists of two robust plastic plates 119 and 121 which, like the adhesive cards 17 and cover cards 18, are provided with parallel recesses 120 which are adapted to the size of the photographs 21 and 22 and between which are provided, in letter box-like compartments 125 of the dispensing frame 113, the photographs 21 and 22 in exactly the same arrangement in which they are to be applied to the adhesive cards 17 in the photograph dispensing means 71. These compartments 125 are defined, laterally and on their rear edges facing the strip removing device 69 with the dispensing frame 113 in the position of use, by the inner flanks 123, 124 and 126 of spacing strips 127, 128 and 129 by means of which the facing inner sides of the two plastic plates 119 and 121 are spaced at a minimum distance necessary for the convenient insertion of photographs 21 and 22 and equal to approximately two to three times the thickness of the photographic film. The lateral spacing between the flanks 123, 124 defining the insert compartments is only very slightly greater than the width of the photograph size of preferably 10 cm so that the photographs are very precisely guided during insertion into and removal from the compartments 125. The photographs 21 and 22 are inserted into and removed from the pockets 125 through a slot 131 which is designed as a substantially rectangular recess in the lower frame plate 121 in the position of use, which plate is arranged at the front ends of the insert pockets 125 facing the deflecting mechanism 72 in the position of use and extends transversely to the conveying direction of the adhesive cards 17. The front side 132 is connected at an obtuse angle to the inner face 133 of the upper frame plate 119 in the position of use and thus extends in the transport direction inclined to the plane of the metal plate 79 when the photograph dispensing frame 113 is in the position of use. The distance between the inner edge 134 of the inclined slotted flank 132 engaging on the inner face of the upper frame plate 119 and the rear limiting side 126 of the letter box-like compartments 125 is somewhat less than the height of the photograph size so that the front edge section 136 of the photographs 21 and 22 engages, bent downward slightly under flexible bending stress, on the sloping front side 132 of the entry or exit slit 131 whereby the photographs 21 and 22 are maintained in their defined insert position in which the rear edge of the photographs 21 and 22 is in contact with the inner flank 126 of the rear spacing strip 129. The upper frame plate 119 is provided with a U-shaped recess 138 which begins with the rear edge, curved like a circular arc, of its central recess 137 and is designed symmetrically with the longitudinal median plane of the insert compartments and the lower frame plate 121 with a groove which is parallel to the edges of the U-shaped recess and claims a central section of the rear edges 139 of the photographs 21 and 22 so that a downwardly projecting sliding tooth 141 of a pusher 118, which is mounted above the dispensing frame 113, can slide with a reciprocating motion in the transport direction and is pivotable about a horizontal axle 142, can drop into the recess or the groove and, when in contact with the rear edge 139 of the photographs 21 or 22, push the latter out of the frame compartments 125.

The photographs 21 or 22 are pushed out of the compartments 125 of the photograph dispensing frame 113 by means of pushers 118 while the adhesive card 17 is conveyed past the photograph dispenser 71. The front flanks 132 of the exit slits 131 then form a guide face which first determines the exit direction of the photographs 21 and 22. The base plate 112 of the insert pocket 116 for the dispensing frame 113 is provided with rectangular through openings which are parallel with the exit slits 131 of the compartments 125 of the dispensing frame 113 and the front edges of which can likewise be bevelled, continuing the incline of the front flank 132 of the exit slit 131 in the dispensing frame 113. Arranged at a short distance from the front edge 144 of the through holes 143 is a guide plate 146 which is inclined in the direction of the metal plate 79 of the transporting device 68 somewhat more steeply then the front flank 132 of the exit slits 131. The guide faces 146 comprise the lower faces of metal plates which are welded to the underside of the base plate 112 and end in an approximately trapezoidal section 147 which is bent in a direction almost parallel to the plane of conveyance extends forward until it engages under the axles 148 of pressure rollers 149 and 151, the said axles 148 being mounted on projections 152 on the underside of the base plate 112 ending at a clear distance from the adhesive card 17. Mounted in front of each pair of through holes 143 is an axle 148 extending over the full width of the base plate 112 and, at each end, supporting a pressure roller 151 for pressing the adhesive card against the conveying belts 83 and 84, each of said rollers being provided with a groove in which the pins of the belts 83 and 84 can engage. In front of each through holes there are provided two pressure rollers 149 which are mounted symmetrically with the longitudinal median line of the successively arranged holes 1/3 and of which the sides 153, directed away from one another, are spaced at a distance approximately equal to the width of the photographs 21 and 22 so that they pass the photographs against the adhesive coating of the card 17 when the photographs have been pushed out sufficiently far along the guide faces 146 and 147. It should also be noted that the slight distance between the somewhat steeper guide face 148 and the front edge of the through holes 143 is advantageous because the front edges of the photographs, when pushed out of the compartments 125, cannot reach a breaking or creasing point where they might be braked, which could lead to undesirable bending on the photographs 21 and 22. The pressure rollers 149 and 151 are made of silicone rubber to prevent the adhesive-coated card from still adhering to the rollers 149, 151, In order that the photographs 21 and 22 may be applied, exactly parallel and in alignment, to the adhesive cards 17, the vertical spacing between the exit slits 131 of the dispensing frame 113 and and the plane of conveyance of the transporting device must not be too great so that the pocket-like compartments 125 can still impart to the photographs a sufficiently good guide when the front edges of the photographs are pushed out until directly above the adhesive card 17. It is therefore advantageous if this spacing is approximately equal to ⅓ to ½ of the height of the photograph size.

The photographs 21 and 22 are simultaneously pushed out of the dispensing frame 113 with the aid of pushers 118, each of which is associated with one of the insert pockets 125. The feed motion of the sliders 118 is synchronized with the transporting device 68 in a manner yet to be described. The feed path of the pushers 118 can be somewhat shorter than the length of the photographs since the latter are moved at the rate of conveyance of the adhesive card 17 from the moment when their front edges come into contact with the adhesive card and are gripped by the pressure rollers 149 and pressed against the card 17.

The pushers 118 and the guide and control means necessary for snychronizing their drives are arranged on the upper side of the cover plate 114 which defines the top of the insert pocket 118 for the dispensing frame 113. The pushers 118 are mounted on a slide 154, which can travel with a reciprocating motion in the conveying direction and is slidably supported and guided on the upper side of the cover plate 114, and comprise one-armed levers which are pivotable in both vertical longitudinal median planes of the insert compartments 125 of the dispensing frame 113 parallel to the transport direction of the adhesive cards 17, which levers are rigidly connected to pivots 142 which extend at right angles to the transport direction and are rotatably mounted in the runners 156 and 157 of the slide 154 slidably supported on the surface of the cover plate 114. The two runners 156 and 157 of the slide 154 are designed as flat bars with their narrow longitudinal faces mounted on the cover plate 114 and extending in the longitudinal direction thereof, and are spaced symmetrically to the vertical longitudinal median plane of the dispensing frame 113 at a distance which is equal to approximately twice the width of the photographs 21 and 22. Acting as guide elements for the slide 154, there are provided two flat guide bars 158 and 159 which are likewise arranged symmetrically with the vertical longitudinal median plane of the frame 113 and extending in the transport direction vertically from the upper side of the cover plate 114, the height of said guide bars being slightly greater than that of the runners 156 and 157 of the slide 154. The lateral spacing between the runners 156, 157 and the guide bars 158, 159 is such that the latter are still arranged within the width of the frame 113. The ends of the guide bars 158, 159 are provided with distance pieces 161, whose vertical inner faces 162 form the outer guide faces for the runner bars 156, 157 The distance pieces 161 are provided with threaded bolts 163 projecting from their inner sides 162 through oblong holes 164 in the runners 156, 157 extending in the feed direction of the slide 154. Screwed on the end sections of the threaded bolts 163 projecting over the inner faces of the runners 156, 157 are plate-shaped guide elements 166, whose diameter is greater than the width of the oblong holes 164 and of which the inner face 167, sliding against the inner face of the runner bars 156, 157 forms the second guide face for the longitudinal guiding of the runners 156, 157. The dimension of the slots 164 is somewhat greater than the feed of the slide 154. The slots 104 are arranged so that the threaded bolts are provided on the front ends of the slots 164 with the slide 154 in the starting position for the pushing movement. The pushers 118 are U-shaped with parallel sides 168 and 169, on the yoke 171 of which is mounted the downwardly projecting sliding tooth 141. In the area of the insert pockets 125 of the frame 113, the cover plate is provided with substantially narrow rectangular recesses 172 and 173, the longitudinal dimensions of which are somewhat greater than the feed of the slide 154 and the width of which is slightly greater than that of the yoke 171 of the pushers 118 so that the yoke 171 can move into these recesses 172 and 173 and the sliding tooth 141 can drop into each U-shaped recess in the upper frame plate 121 and come into contact with the rear edges of the photographs 21 or 22 to push out same when the slide 154 is moved in the transport direction. The pushers 118 are each supported, with a belt 174 projecting at right angles from the inner sides 168, on the inner longitudinal edge of the recesses 172 or 173 and pressed against the upper side of the cover plate 114 by means of a spiral spring 176 which concentrically encircles the pivot 142, one arm of the said spring being anchored to the adjacent runner bar 156 or 157 and the other arm overlapping the outer side 169 of the pusher 118. In their starting position shown in FIG. 10 the pushers 118 are supported an a horizontal end section 177 of a short upwardly inclined guide lug 178 originating at the inner edges of the recesses 172, 173 of the cover plate 114, along the surface of which guide lug the pusher slides downwardly at the beginning of the feed of the slide 154, the sliding tooth 141 moving into contact with the rear edges of the photographs 21 or 22 and being lifted out of the dispensing frame 113 and recess 172 or 173 again at the end of the return movement of the slide 154.

Between the two front pivots 142 of the pushers 118, the upper sides of the runner bars 158, 157 are provided with a toothing 179 with which mesh two gears 181 non-rotatably connected to a driving shaft 182 which extends at right angles to the direction of feed and is rotatably mounted on the guide bars 158 and 159. Depending on the direction of rotation of the driving shaft 182, the slide 154 is moved back or forward in the transport direction of the adhesive card 17. The driving shaft 182 comprises a section 183 extending over the cover plate edge directed away from the front panel 57 of the housing 56, the free end of the said section carrying a driving pinion 184 meshing with a toothed rack 187 which is slidably guided with a reciprocating motion in the direction of feed on a rectangular projection 186 of the cover plate 114. The rack 187 is driven by means of a driving linkage 188 arranged on the outside of the rear wall of the housing 56, its essential details being illustrated in FIG. 12. The linkage 188 operating in a vertical plane comprises a first pivot lever 189 which, by means of a tension spring 191, is maintained in contact with a disc cam 192 comprising a control cam 193, the rotation of which transmits a timecontrolled pivoting motion to the first lever, the duration and amplitude of this motion being determined by the radial position of the control cam 193 relative to the axle 194 of the disc cam 192, which completes a full revolution during one work cycle in which a frame is made. The pivoting motion of the first lever 189 is transmitted by means of an articulated bar to a second lever 197, the free end of which comprises a pin 198 projecting at right angles to the plane of the linkage and engaging in the slot 199 of the fork 201, which is rigidly connected to the reciprocating toothed rack 187. Synchronized movement of the slide 154 and transporting device 68 for the adhesive cards 17 is simply achieved with the aid of the driving linkage 188 and the disc cam 192 driven by the central driving motor of the apparatus, if necessary, via a gear.

The deflecting mechanism 72 for diverting the conveyed adhesive cards 17 through 180° in the direction of the pressure glueing means comprises a deflection roller 202 of relatively large diameter and pressure rollers 203, 204 and 206 of smaller diameter which are distributed over the circumference along the area of deflection. Each group of these three rollers 203, 204 and 206 are mounted in a vertical plane running in the transport direction. Running round these rollers mounted in the same plane is a silicone rubber belt frame pushed a little further out of the compartment 116 by the action of the tension springs 226.

After a first frame has been made in the apparatus, the adhesive card 17 is supplied in the dispenser 71 at the beginning of each following work cycle and the covering card 18 conveyed upward by means of the pin feed rollers 46, 47 until its front edge lies in the cutting plane of the blade 221. The distance which the adhesive card 17 has to cover as far as the glueing station is then substntially greater than the distance the covering card 18 must cover to reach the glueing station. Rotation of the pin feed rollers 46 and 47 should therefore not commence until the front edges of the adhesive cards 17 have reached the same distance from the glueing station as the front edges of the covering cards 18.

To achieve this forward movement of the adhesive card 17, there is provided a positive coupling which is likewise controlled by the disc cam 192 and connects to the pin feed rollers to the central drive when the said distance is reached. Moreover, the driving motion of the horizontal transporting device 68 is interrupted, if the rear ends of the adhesive cards have left the dispenser 71, in order to prevent the following adhesive card 17, which has in the meantime been conveyed into the photograph dispenser 71, from being conveyed any further and ensure that it is available for the next work cycle.

To simplify the first loading of the apparatus, the removal means 69 and the photograph dispenser 71 are both designed as units capable of upward pivoting.

What I claim is:

1. Apparatus for framing a plurality of X-ray photographs of a given size with the aid of a flexible frame which comprises two frame cards and in which the photographs are mounted between recesses in the frame cards adapted to the size of the photographs, at least one of which cards is in the form of a mount with a self-adhesive coating of glue, with which the card adheres to parts of the photographs extending beyond the recess edges, both the adhesive-coated card and its covering frame card being provided along their lateral edges with perforations for cooperating with a transporting device using pin feed means, comprising A first transporting device for said adhesive-coated card having a flat transporting section, a photograph dispensing means arranged above said first transporting device by means of which the photographs are arranged in a predetermined order and applied to said adhesive-coated card in this order, Said photograph dispensing means comprising a frame which consists of relatively thick upper and lower plates provided with recesses of the same shape and size as those in said frame cards, which can be removably inserted into the apparatus, said frame having an opening which leads into said recesses, the photographs being arranged in the said frame at a distance from the transporting plane of said first transporting device which is substantially less than the length of the photographs measured in the transporting direction, in which frame the photographs can be slideably mounted in letter box-like compartments for guiding in the transport direction, the lower frame plate being provided with an exit slit and guideface for each compartment in the direction of transport and inclined towards the transporting plane, through which slit the photograph can be applied to said adhesive card via said guide face, a pusher means which drops into said opening in said frame leading into said recesses, which can engage on the rear edge of the photograph directed away from said slit to move this edge, a deflecting mechanism following said first transporting device which diverts said adhesive card provided with photographs and moving in the transport direction, a pressure glueing station to which said adhesive card is directed where said covering card is glued to the adhesive card, a second transporting device which conveys said covering card to said pressure glueing station, which can be synchronized with said first transporting device in such a manner that said covering card and said adhesive card meet with a coincident arrangement of their recesses at the pressure glueing station, a transfer mechanism following said pressure glueing station which grips the glued-together frame and transfers the frame to a delivery station, a delivery station following said transfer mechanism for receiving said frame.

2. Apparatus as claimed in claim 1, wherein said first transporting device comprises a horizontal plate supporting at least the area of the adhesive cards where the photographs are applied, two pin feed belts which rotate on both longitudinal sides of said horizontal plate and engage with their pins in the edge perforations on said adhesive cards, the upper sides of said belts extending through the plane of said plate, and, one or more commonly driven gears, the inner sides of said pin feed belts being in the form of toothed belts which mesh with said gears.

3. Apparatus as claimed in claim 2, comprising a base plate on said photograph dispensing means, said photograph dispensing frame is located on said base plate, said base plate being provided with apertures for opening into said exit slits of said lower frame plate and the guide face of the exit slit and supporting guide elements extending in the direction of the transporting plane of said first transporting device.

4. Apparatus as claimed in claim 3, comprising pressure rollers made of silicone rubber, which are spaced apart by a distance approximately equal to the width of the photographs provided on the underside of said base plate approximately at the height of the ends of said guide elements which impart an angle of inclination to guide the photographs and press the photographs against the adhesive coating of said cards, said guide elements being designed as sliding plates which are arranged between said pressure rollers, beginning at a short distance from the edge of said exit apertures in said base plate facing said sliding rollers and extending from the latter with a somewhat stepper incline than the exit slits in said photograph dispensing frame, the sliding face of the said sliding plates extending until it lies below the axle of said sliding rollers.

5. Apparatus as claimed in claim 3 wherein said photograph dispensing means comprises a cover plate which is spaced from said base plate by a distance equal to the thickness of said photograph dispensing frame and, together with said base plate, defines an insert pocket for said photograph dispensing frame, said cover plate being provided with slit-shaped apertures extending approximately over the length of the photographs through which downwardly projecting parts of said pusher means in their position of contact with the rear edges of the photographs can drop into said recesses in the frame to move the edges of the photographs.

6. Apparatus as claimed in claim 5, wherein said insert pocket is defined in its longitudinal direction by guide elements engaging on the front and rear transverse edges of the photograph dispensing frame.

7. Apparatus as claimed in claim 5 comprising a control device which monitors and limits the insert movement of said photograph dispensing frame and sets the apparatus into operation, maintaining said photograph dispensing frame in its inserted position at least until the removal of the photographs is completed, releasing said photograph dispensing frame again at the end of this work cycle and pushing it at least a short distance out of said insert pocket when said pusher means are returned to their starting position.

8. Apparatus as claimed in claim 7, wherein said control device comprises two levers, provided on a shaft rotatably mounted above said cover plate in the longitudinal direction of said photograph dispensing frame, and projecting downwardly through transverse slits in said cover plate, which levers come into contact with the inner longitudinal edge of said photograph dispensing frame upon insertion thereof and are pivoted in opposite to the force of tension springs, said photograph dispensing frame being locked simultaneously and the work cycle of the apparatus initiated, which levers eject said photograph dispensing frame from said insert pocket again when swinging back under the influence of the tension springs if the locking of said insert pocket is terminated after the work cycle is completed.

9. Apparatus as claimed in claim 5 wherein said pusher means are in the form of onr-armed levers, pivotably mounted on axial rods which extend transversely to the feed direction and are rigidly mounted in a slide capable of reciprocating movement along the feed path, and resiliently supported on the upper side of said cover plate, a downwardly projecting sliding tooth being arranged on the free end of each layer, the pusher means being supported in their starting position on an horizontal end section of a guide lug sloping in the direction of feed and projecting upwardly from said cover plate which keeps said sliding tooth at a vertical distance from the recess in said photograph dispensing frame.

10. Apparatus as claimed in claim 9, comprising a shaft crossing said slide at right angles to the feed direction and mounted on said cover plate, provided for driving said slide and comprising two gears rigidly connected to the shaft and meshing with toothed racks mounted on and rigidly connected to both lateral edges of said slide, and the end of the said shaft extending over the edge of said cover plate being provided with another gear which is nonrotatbly mounted thereon and meshes with a toothed rack, driven with a reciprocating motion in the direction of feed.

11. Apparatus as claimed in claim 10, wherein said photograph dispensing means is designed as a unit capable of pivoting on the outside of the housing opposite said rack or about an axle extending outside said rack when seen from said first transporting device.

12. Apparatus as claimed in claim 1 wherein the feed motion of said pusher means and said first transporting device is synchronized so that said pusher means are moved at approximately the same as said transporting device.

13. Apparatus as claimed in claim 10, wherein the reciprocating motion of said toothed rack driving said shaft is derived with the aid of a driving linkeage from the rotary motion of a disc cam which is driven by a central driving motor and controls the deflection of a one-armed lever in opposition to the tension of a return spring, which lever is pivotally connected by means of a push rod to a second one-armed lever some distance from the pivot thereof, the free end of the said second lever engaging, with a pin extending perpendicular to the pivoting plane, in the slit of a fork rigidly connected to said rack.

14. Apparatus as claimed in claim 1 wherein said deflecting mechanism alters the transporting direction of said adhesive cards by 100° and is provided between the photograph dispensing means on the one hand, and the pressure glueing station, on the other.

15. Apparatus as claimed in claim 14, wherein said deflecting mechanism comprises a deflection roller designed as a smooth roller with a relatively large diameter, and a pressing mechanism for maintaining said adhesive card and the photographs in the largest part of the deflecting range in direct contact with said deflection roller, and said pressure glueing station is arranged at the end of the deflection area.

16. Apparatus as claimed in claim 15, wherein said pressing mechanism comprises pressure rollers distributed over the circumference of said deflection roller in the deflection area.

17. Apparatus as claimed in claim 16, wherein said pressure rollers of the pressing mechanism are provided with a rotating belt which presses said adhesive card against said deflection roller under flexible tension, or a plurality of such belts distributed at intervals over the length of said deflection roller.

18. Apparatus as claimed in claim 14 wherein said deflection roller is rotated at such a speed that its circumferential speed is approximately 4 to 8% higher than the conveying speed of said adhesive card in said first transporting device.

19. Apparatus as claimed in claim 1 wherein said deflecting mechanism comprises a deflection roller and said second transporting device for said covering cards comprises two pin feed roller means which cooperate with the card edge perforations and divert the conveyance of said covering cards in the direction of said pressure glueing station, the rotating axle means of said pin feed roller means being vertically spaced from the axle of said deflection roller by a distance somewhat greater than the sum of the radius of the pin feed roller means and the radius of the deflection roller, multiplied by the height of the pins, and laterally spaced from said glueing station.

20. Apparatus as claimed in claim 19, wherein the diameter of the pin feed roller means is such that the rollers rotate through exactly 360° during each work cycle.

21. Apparatus as claimed in claim 19 wherein said covering cards are maintained in contact with said pin feed roller means by guide yokes provided with longitudinal slots for engaging the pins of the pin feed roller means, which guide yokes comprise an end section facing said pressure glueing station, and inclined upwardly in a direction under the axle of said deflection roller, said end section extending approximately tangentially away from the circumference of said pin feed roller means and ending at a vertical distance from the axle of said pin feed roller means which distance if greater than the radius of said pin feed roller means multiplied by the pin height.

22. Apparatus as claimed in 21, comprises a guide face which is slightly convexly curved relative to the longitudinal direction of the axle of the pin feed roller means, arranged at least between the tangentially running end sections of said guide yokes.

23. Apparatus as claimed in claim 19, wherein the drive of the pin feed roller means is positively connected to the drive for said first transporting device by a coupling which is controlled by a disc can rotating once in each work cycle.

24. Apparatus as claimed in claim 19 comprising a pressure roller mounted to project into the space between said pin feed roller means and wherein said transfer mechanism comprises two pressure rollers extending over the entire width of the finished frame and rotating in opposite directions.

25. Apparatus as claimed in claim 1 wherein said adhesive cards are mounted, at regular intervals approximately equal to the distance between two holes of the edge perforations, on a protective and transporting strip made of silicone paper or the like, which adheres detachable to the adhesive coating on said adhesive cards and can be removed by means of a device, arranged in front of said first transporting device as seen in the transporting direction and comprising a deflecting mechanism for said adhesive card strip, and wherein said covering cards are supplied in the form of a strip which is formed of covering cards joined together on the transverse edges and separated from one another by a perforated edge.

26. Apparatus as claimed in claim 25, wherein the supply strip for said adhesive cards and the supply strip for said covering cards are provided with concertinatype folds in stores arranged below the apparatus.

27. Apparatus as claimed in claim 24 wherein the circumferential speed of the pressure rollers of said transfer mechanism is greater than the circumferential or conveying speed of the pin feed roller means.

28. Apparatus as claimed in claim 27, wherein the variation in speed is between 1 and 3% and preferably 1.5%.

29. Apparatus as claimed in claim 24 comprising a control means for stopping the pin feed roller means when the ends of said covering cards are lifted out of the position of engagement of the pins of the roller means.

30. Apparatus as claimed in claim 24 comprising an activated blade, extending radially outwardly between the pin feed roller means and controlled in accordance with the work cycle by a disc cam positively connected to the drive of the pin feed roller means, which is provided for separating said covering cards joined together in the strip, the said blade cooperating with a cutting surface which extends radially and connects the free ends of a guide yoke, for maintaining said covering cards in contact with said pin feed roller means.

* * * * *